(12) United States Patent
Tsai

(10) Patent No.: US 6,750,909 B1
(45) Date of Patent: Jun. 15, 2004

(54) IMAGE BUFFER BETWEEN BURST MEMORY AND DATA PROCESSOR WITH MULTIPLE ACCESS MODES SET BY THE DATA PROCESSOR

(75) Inventor: Mandy Mei-Feng Tsai, Taipei (TW)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/534,785

(22) Filed: Mar. 24, 2000

Related U.S. Application Data

(60) Provisional application No. 60/126,584, filed on Mar. 26, 1999.

(51) Int. Cl.[7] .............................................. H04N 5/226
(52) U.S. Cl. .................................. 348/231.2; 348/231.3
(58) Field of Search .......................... 348/207.1, 220.1, 348/222.1, 231.99, 231.1, 231.2, 231.3, 231.6, 231.7, 231.8, 231.9, 317; 386/32, 107, 117

(56) References Cited

U.S. PATENT DOCUMENTS

| | | |
|---|---|---|
| 5,164,831 A | 11/1992 | Kuchta et al. |
| 5,239,387 A | 8/1993 | Stein et al. |
| 5,673,422 A | 9/1997 | Kawai et al. |
| 6,111,604 A * | 8/2000 | Hashimoto et al. ...... 348/220.1 |
| 6,374,033 B2 * | 4/2002 | Hoshi .......................... 386/32 |
| 6,515,703 B1 * | 2/2003 | Suzuki et al. ............... 348/317 |
| 2001/0017657 A1 * | 8/2001 | Kowno et al. .............. 348/231 |
| 2003/0058355 A1 * | 3/2003 | Wong et al. ........... 348/231.99 |

FOREIGN PATENT DOCUMENTS

| | | |
|---|---|---|
| EP | 0 393 509 A | 10/1990 |
| EP | 0 576 226 A | 12/1993 |
| EP | 0 605 185 A | 7/1994 |

* cited by examiner

Primary Examiner—Tuan Ho
(74) Attorney, Agent, or Firm—Robert D. Marshall, Jr.; W. James Brady, III; Frederick J. Telecky, Jr.

(57) ABSTRACT

An image processing system comprising a burst memory; a data processor; and a data buffer coupled between the burst memory and the data processor. The data buffer comprises a block memory (81) coupled to the burst memory and to the data processor via a switch (83); and an access controller (82) coupled to the block memory (81), to the data processor and to the burst memory. The access controller (82) transfers data from the burst memory to the block memory (81) in a format specified to the access controller by the data processor via a first state of the switch (83). The access controller (82) also transfers the formatted data from the block memory (81) to the data processor via a second state of the switch (83). The format can comprise a block of data, a line of data, or data sampled from spatially diverse locations within a picture frame of data.

8 Claims, 9 Drawing Sheets

|   | 1 | 2 | 3 | 4 | 5 | 6 | 7 | 8 |
|---|---|---|---|---|---|---|---|---|
| 1 | P11 | P12 | P13 | P14 | P15 | P16 | P17 | P18 |
| 2 | P21 | P22 | P23 | P24 | P25 | P26 | P27 | P28 |
| 3 | P31 | P32 | P33 | P34 | P35 | P36 | P37 | P38 |

Block Mode

FIG. 3A

SDRAM 6

| Address | Content | |
|---|---|---|
| | | |
| 1000 | P1 | |
| 1001 | P2 | ⎫ |
| | ⋮ | ⎬ 1st burst |
| 1007 | P8 | ⎭ |
| 1008 | P9 | ⎫ |
| | ⋮ | ⎬ 2nd burst |
| 1017 | P16 | ⎭ |
| 1018 | P17 | ⎫ |
| | ⋮ | ⎬ 3rd burst |
| 1025 | P24 | ⎭ |
| 1026 | P25 | ⎫ |
| | ⋮ | ⎬ 4th burst |
| 1033 | P32 | ⎭ |
| | | |

FIG. 4B

IMAGE BUFFER BETWEEN BURST MEMORY AND DATA PROCESSOR WITH MULTIPLE ACCESS MODES SET BY THE DATA PROCESSOR

CROSS-REFERENCE TO COPENDING APPLICATION

This application claims the benefit of U.S. Provisional Application No. 60/126,584, filed on Mar. 26, 1999, the entire disclosure of which is hereby incorporated herein by reference.

FIELD OF THE INVENTION

The invention relates to image processing, and more particularly to a method and system for allowing a data processor to efficiently access image data from a memory in multiple formats.

BACKGROUND OF THE INVENTION

In a conventional image processing system such as a digital still camera, an image sensor within an image gathering device, such as a charge-coupled device (CCD) or a CMOS sensor, converts a picture frame of image light information to electronic analog signals. The resultant analog image signals are converted by an analog-to-digital converter (ADC) to digital image data. The digital image data is then transferred to a memory storage device. Burst access memories such as synchronous dynamic random access memory (SDRAM) or conventional burst DRAMs are popular in camera designs for their ability to output large amounts of data quickly.

A data processor, such as a digital signal processor (DSP), typically accesses data a word at a time by referring to a specific word address in the DRAM. In contrast, a burst access memory is designed to output multiple pieces of data based on a single address reference. Therefore, in conventional imaging systems that use a DSP and a burst access memory, the data burst is not fully used. In addition, as many as three clocks cycles of latency time can be consumed as the digital signal processor addresses the SDRAM memory for each word of data it requires. In image processing, it is particularly advantageous to access stored data block by block, which a burst access memory is well suited for, rather than line by line or bit by bit. Digital signal processors are not particularly suited for retrieving block data from memory, however. For example, in performing a seven-tap filtering function, the processor will request seven bursts of data from the memory and the read/write overhead will be 21 clock cycles, assuming once again that three clock cycles of latency are necessary for each burst.

Another problem with conventional image processing solutions is that sampling of discontinuous pieces of data within a memory also requires excessive data processor overhead since the processor must locate and address data that may be spread throughout the image.

Finally, in prior art digital still cameras, the brightness of the photographed image is controlled by means of a diaphragm mechanism by driving the lens control device in accordance with brightness data of the photographed object detected by an auto exposure sensor and an auto-exposure calculating device. Furthermore, prior art cameras typically include a special sensor designed to detect the distance to the subject to allow for automatically focusing the lens. Consequently, in the conventional digital still camera, the manufacturing costs and size of the camera increase with the addition of auto exposure and auto focus functionality. There is a need for an image processing system that can reduce processor overhead, allow determination of photographic parameters like white balance and brightness, and provide auto focus functionality with reduced manufacturing costs and system size.

SUMMARY OF THE INVENTION

In embodiments disclosed herein the present invention provides an image buffer which can execute auto exposure and white balance by sub-sampling (down-sampling) the photographed image data stored in the memory and then transferring the sampled image data to the processor for exposure calculation and white balance calculation when the photographed image data are retrieved either in line access mode or in block access mode in response to a request from the processor. The sampling rate can be controlled by the processor in a programmable manner and the auto exposure and auto white balance of the photographed image data can be executed efficiently while still providing satisfactory results.

In one embodiment of the invention, an image processing system is disclosed. The system comprises a memory capable of storing a picture frame of image data and outputting the data in a format comprising one or more bursts of data; a data processor capable of processing at a given time an amount of data less than the one or more bursts of data; and a data buffer coupled between the memory and the data processor. The data buffer has a size sufficient to store the one or more bursts of data and capable of outputting an amount of data within the processing capability of the data processor. The format can comprise a block of data, a line of data, or data sampled from spatially diverse locations within the picture frame of data.

In another embodiment of the invention, an image processing system is disclosed. The system comprises a burst memory; a data processor; and a data buffer coupled between the burst memory and the data processor. The data buffer comprises a block memory coupled to the burst memory and to the data processor; and an access controller coupled to the block memory, to the data processor and to the burst memory. The access controller transfers data from the burst memory to the block memory in a format specified to the access controller by the data processor. The access controller also transfers the formatted data from the block memory to the data processor. The format can comprise a block of data, a line of data, or data sampled from spatially diverse locations within the picture frame of data.

In yet another embodiment of the invention, a method of processing image data in a camera is disclosed. The method comprises the steps of storing the image data in a memory; selecting a portion of the image data in a format determined by a data processor coupled to the memory; storing the formatted data in a second memory; and transferring the formatted data to the data processor.

One advantage of the invention is that it provides an efficient interface between a processor and a memory like a burst access DRAM by, for example, increasing the processing bandwidth of the processor by reducing the overhead for data access. Another advantage of the invention is that it allows for sampling of data within an image that can be used in image enhancement calculations performed by the data processor.

BRIEF DESCRIPTION OF THE DRAWINGS

Other aspects and advantages of the invention will become apparent from the following descriptions taken in conjunction with the accompanying drawings, wherein:

FIG. 3A illustrates how the photographed image data are retrieved in a block access mode;

FIG. 4B illustrates how the image data retrieved in a line access mode is stored in a memory.

DETAILED DESCRIPTION OF THE INVENTION

Figure 1:
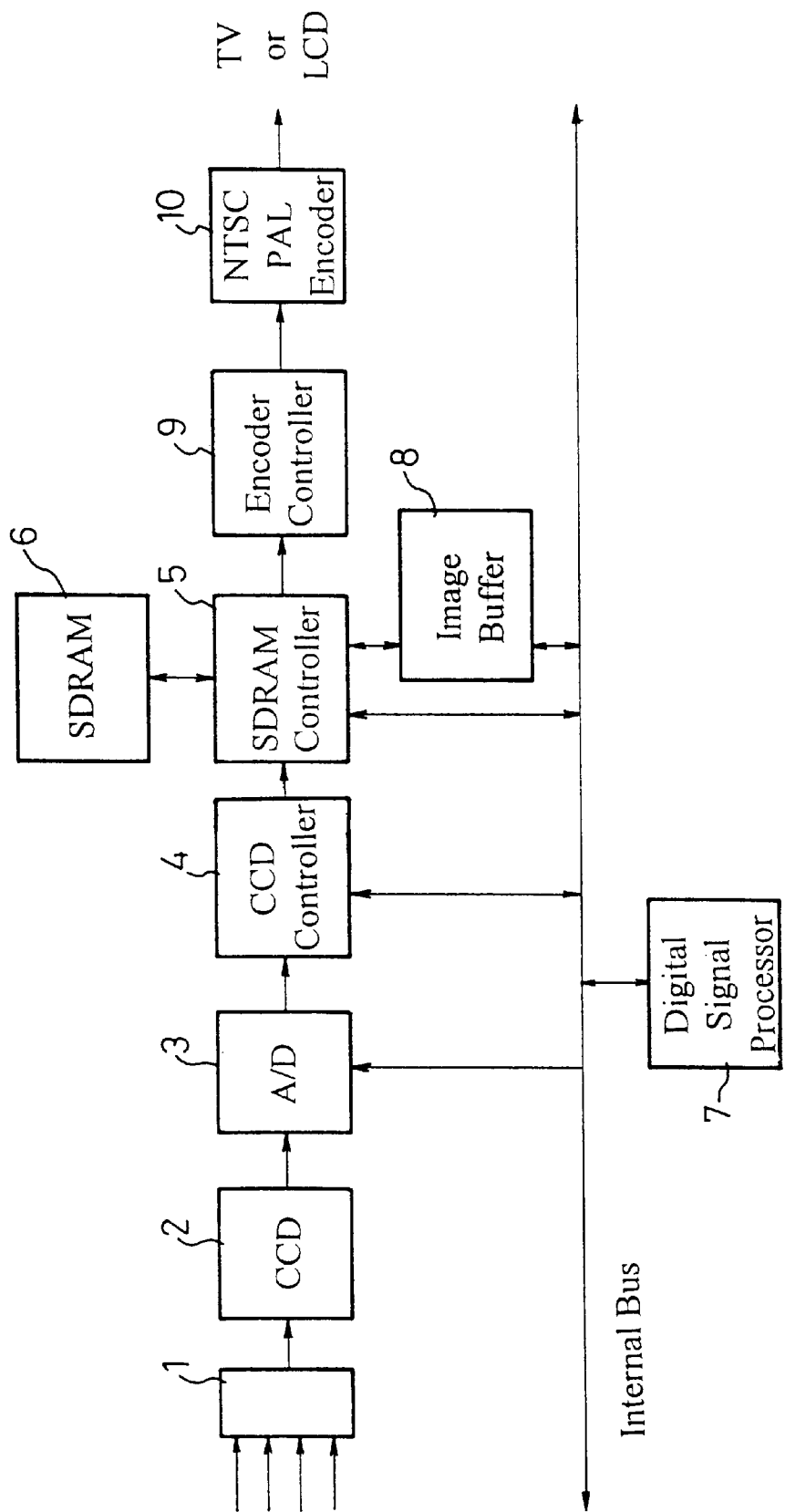
FIG. 1 shows a simplified schematic block diagram of the improved digital still camera according to an embodiment of the present invention.

One embodiment of the invention provides a highly efficient block type single port image buffer as an interface between a data processor (e.g. a digital signal processor) and an SDRAM controller such that the image data within the SDRAM can be retrieved in a block access mode, a line access mode or a sub-sampling mode in response to the control signals from the digital signal processor. The image buffer comprises a block buffer, an access controller and a switch wherein the block buffer is a shared memory of the data processor and the SDRAM controller. The access controller can be set in a block access mode, a line access mode or a sub-sampling mode by the data processor via the internal control bus therebetween. The selection of the block access mode, line access mode and sub-sampling mode is based on the type of data to be processed by the data processor. For example, the block access mode is suitable for flexibly processing the image taken by the CCD sensors, while the line access mode is suitable for storing normal format data, such as operating system instructions, image compression bit stream (JPEG), voice data received from a microphone built into the camera, or an external voice source. The sub-sampling mode is selected, for example, when the focusing, exposure control, and white balance of the photographed image data are to be performed. The functions of focusing, exposure control, and white balance of the photographed image data are done by computing image statistics based on image data in the data processor. The computed values are then used by a program implemented in the data processor that decides how to adjust the focus motor, aperture, auto gain control, and auto white balance control.

In one embodiment, the switch is configured to selectively connect the block buffer either to the data processor or to the SDRAM controller in response to a control signal from the access controller. The block buffer is a shared memory of the data processor and the SDRAM controller. Namely, the data processor first sends some basic information concerning the data to be processed to the access controller. The data to be processed may be block(s), line(s), or interleaved bursts within a picture frame of data. The access controller then generates the address of the data to be processed and provides it to the SDRAM controller based on the received basic information. The data to be processed by the processor will be temporarily moved by the SDRAM controller to the block buffer in a block access mode, a line access mode or a sub-sampling mode. The data processor halts the currently processing job in order to receive the data from the block buffer in response to an interrupt signal from the image buffer. In other words, an access controller and a block buffer within the image buffer access the image data to be processed by the data processor from the SDRAM in different access modes. For example, the image buffer can access the SDRAM in a block access mode in which image data within a picture frame is accessed with an address offset being equal to one line width. Alternatively, the image buffer can access the SDRAM in a line access mode in which contiguous data within a picture frame are accessed with the address offset being equal to one burst size of data which can be accessed from the SDRAM per clock cycle.

According to one embodiment of the invention, the size of a block or the number of bursts for one access operation can be set by the data processor. Moreover, the image buffer can perform sub-sampling of the image data to be processed by the data processor by setting the address offset to be the sub-sampling interval (e.g. an integral multiple of the burst size of data that can be accessed from the SDRAM per clock cycle). The different address offsets can be set by the data processor and are sent to the access controller within the image buffer to achieve the different access modes.

Reference now will be made in detail to preferred embodiments of the present invention as illustrated in the accompanying drawings in which like reference numerals designate like or corresponding elements throughout the drawings.

As has been described above, embodiments of the invention provide a data interface between the data processor and the memory for processing data more efficiently. The invention is illustrated and explained hereinbelow with reference to a digital still camera, but one skilled in the art will appreciate that the scope of the invention is not limited thereto.

FIG. 1 depicts a simplified schematic block diagram of a digital signal processing system. Reference numeral 1 denotes a photographing lens optical system receiving the image light of a photographed object. When the picture is taken, the image light is then exposed to a charge-coupled device (CCD) 2 for electronically converting the image light to an electronic analog image signal. An A/D converter 3 transforms the analog image signal into digital image data. A CCD controller 4 then transfers the digital image data via an SDRAM controller 5 to a semiconductor memory such as a synchronous dynamic random access memory (SDRAM) 6 for temporary storage. To be displayed on a TV or LCD device, the image data from the SDRAM 6 is further processed by an encoder controller 9 and an NTSC/PAL encoder 10.

Figure 2A:
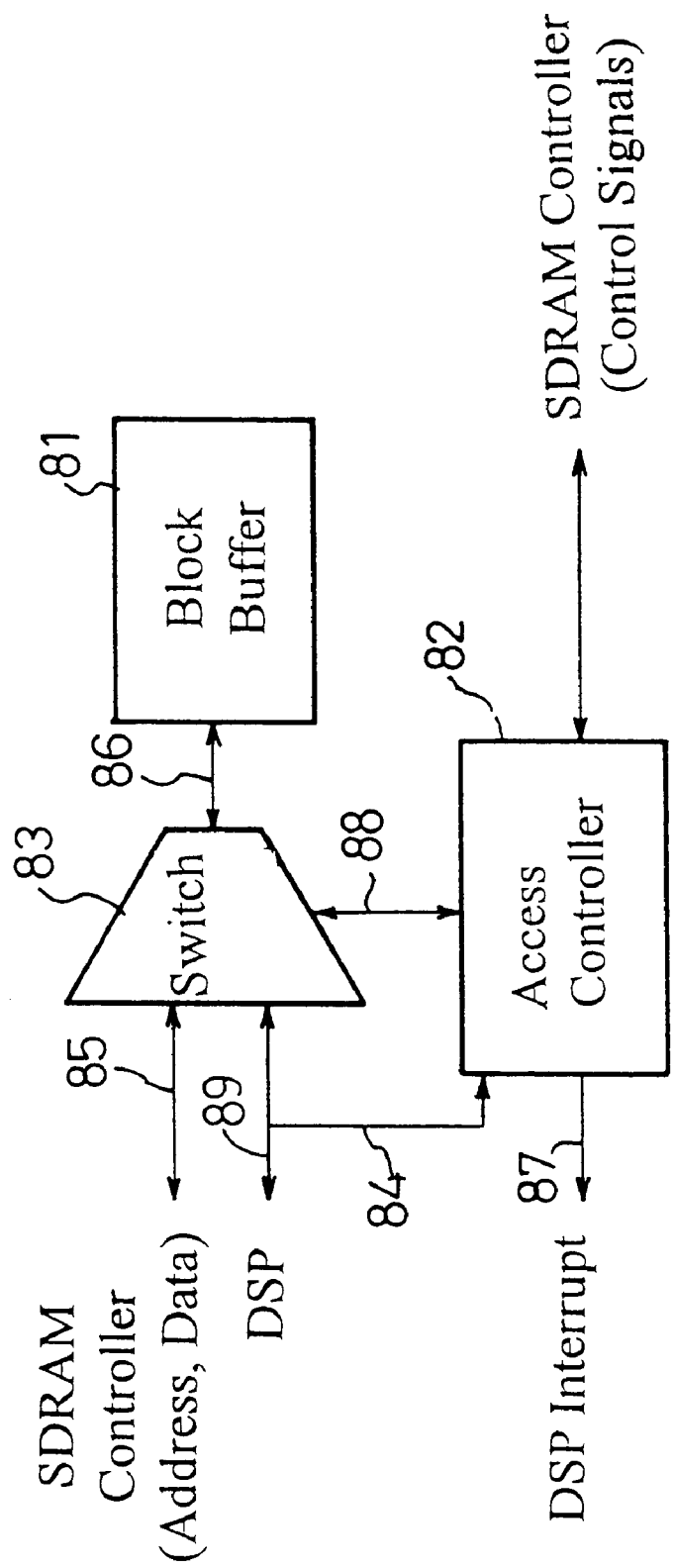
FIG. 2A shows the block diagram of the image buffer of FIG. 1 according to an embodiment of the present invention.

The most common type of SDRAM in this application is a burst access SDRAM because of the speed with which data can be read from the memory. Unfortunately, data processors (e.g. digital signal processors and microprocessors) typically process one bit of data at a time. Therefore, the speed of the burst access memory is sacrificed in conventional systems since only the initial word or data in the burst of data can be used by the data processor. In order to flexibly adjust the size of the image data to be processed by the digital signal processor (DSP) 7 and to reduce the read/write overhead for the initialization process when the digital signal processor 7 accesses data to/from the SDRAM, this embodiment of the invention provides an image buffer 8 as an image data interface between the SDRAM controller 5 and the digital signal processor 7. In detail (referring to FIG. 2A) the image buffer 8 comprises a block buffer 81, which is a shared memory of the digital signal processor 7 and the SDRAM controller 5, an access controller 82 and a switch 83.

In this embodiment, the block buffer 81 has a size of 16×22 pixels, which is suitable enough for a frame of image data in JPEG format (the size for JPEG image data is 8×8 pixels). The access controller 82 can be set in a block access mode (FIG. 3A), a line access mode (FIG. 3B) or a sub-sampling mode (FIG. 3C) by the digital signal processor 7 via the internal control bus 84 therebetween. The switch 83 is configured to selectively connect the block buffer 81 either to the digital signal processor 7 or to the SDRAM controller 5 in response to a control signal from the access controller 82. The switch may be implemented as a multiplexer or similar circuit. Thus, in this embodiment data at a certain location within the SDRAM 6 to be processed by the digital signal processor 7 will be temporarily moved through image bus 85 and bus 86 to the block buffer 81 in a block access mode, a line access mode or a sub-sampling mode in response to a request from the digital signal processor 7 via bus 84. Once the data is in block buffer 81, it can be accessed by the digital signal processor 7. The block access mode, line access mode or sub-sampling mode is selectable based on the type of data within the SDRAM 6 that the digital signal processor 7 is to access. The block access mode is especially suitable for the digital signal processor 7 to process any portion(s) of block type image data located in a picture frame of data captured by the CCD 2. The line access mode can be used for the digital signal processor 7 to process any portion(s) of strip type image data located in a picture frame of data, or when line mode is the normal data storage format, such as with voice data received from a microphone (not shown) built into the camera or from external voice equipment.

According to another embodiment of the present invention, the digital signal processor 7 can also retrieve the image data from the SDRAM 6 in a sub-sampling mode (FIG. 3C) by sending a sub-sampling rate to the access controller 82 via the bus 84.

According to another embodiment of the present invention, the digital signal processor 7 can also retrieve the image data from the SDRAM 6 in a sub-sampling, block access mode or a sub-sampling, line access mode by setting the sub-sampling rate, the block starting address, and the offset of the image data in the access controller 82.

Figure 2B:
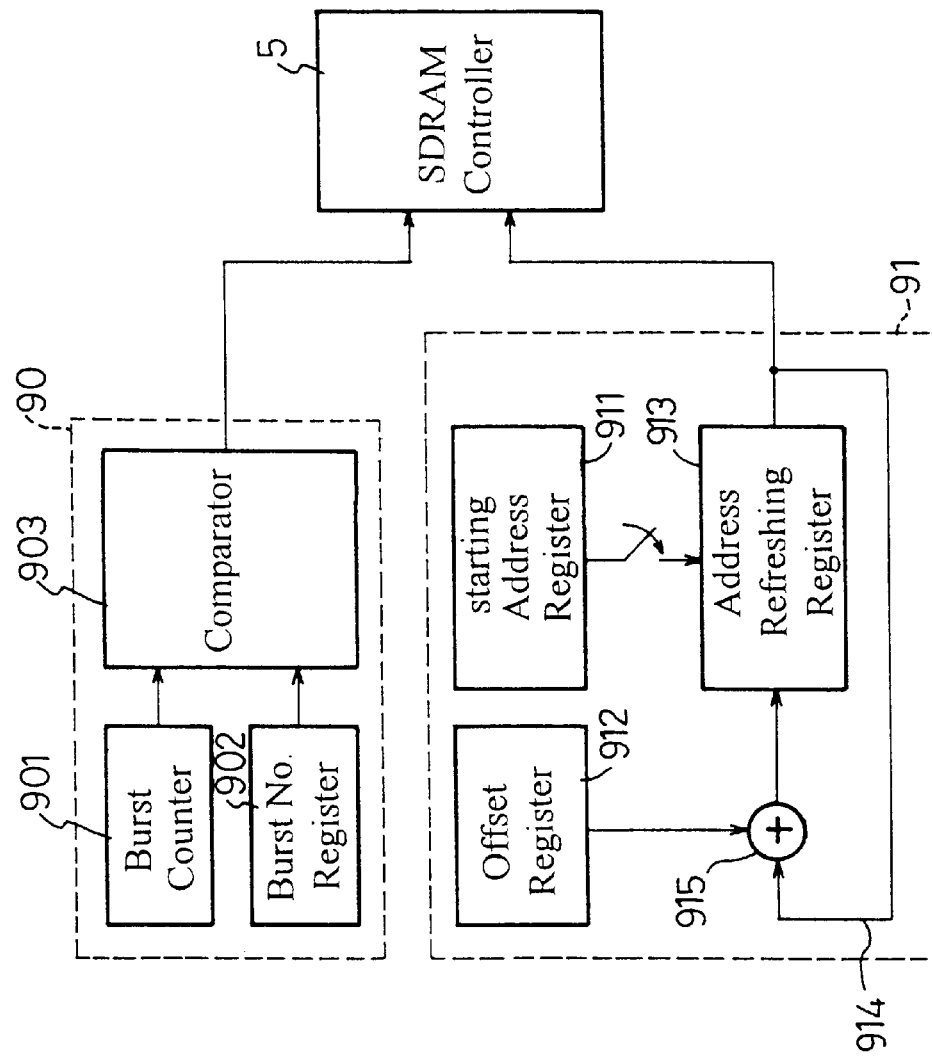
FIG. 2B shows the block diagram of the access controller of FIG. 2A according to an embodiment of the present invention.

Referring to FIG. 2B, according to one embodiment of the present invention, the access controller 82 comprises a termination signal generator 90 and an address generator 91. The termination signal generator 90, configured to generate an enabling signal indicating that the burst access of image data within the SDRAM 6 is finished, comprises a burst counter 901, a burst number register 902, and a comparator 903. In FIG. 2B, the burst counter 901 is an up counter, which has an integral increment counter at the output thereof per burst access cycle synchronous with the SDRAM controller 5. The burst number register 902 is programmed by the digital signal processor 7 to store the burst number of the image data to be processed by the digital signal processor 7. As the digital signal processor 7 retrieves image data from the SDRAM 6 via the image buffer 8, the digital signal processor 7 sends a control signal through bus 84 to the access controller 82 within the image buffer 8. The access controller 82 then accordingly controls the switch 83 via control line 88 to receive the address information of the image data to be retrieved via bus 89. The address information of the image data to be retrieved, such as the burst number, or whether the retrieved data will be in block mode, line mode or sub-sampling mode having a certain sub-sampling rate, is then fed into the termination signal generator 90 and address generator 91. When the burst number set by the digital signal processor 7 within the burst number register 902 equals the progressively counting value output by the burst counter 901, the comparator 903 will generate an enabling signal to the SDRAM controller 5, indicating that the burst access of the image data within the SDRAM 6 is finished. Alternatively, the termination signal generator 90 can be implemented with a down counter in which the starting count value is equal to the burst number set by the digital signal processor 7. When down-counting to zero, the down counter will send an enabling signal to the SDRAM controller 5, indicating termination of the block access of the image data.

Figure 3B:
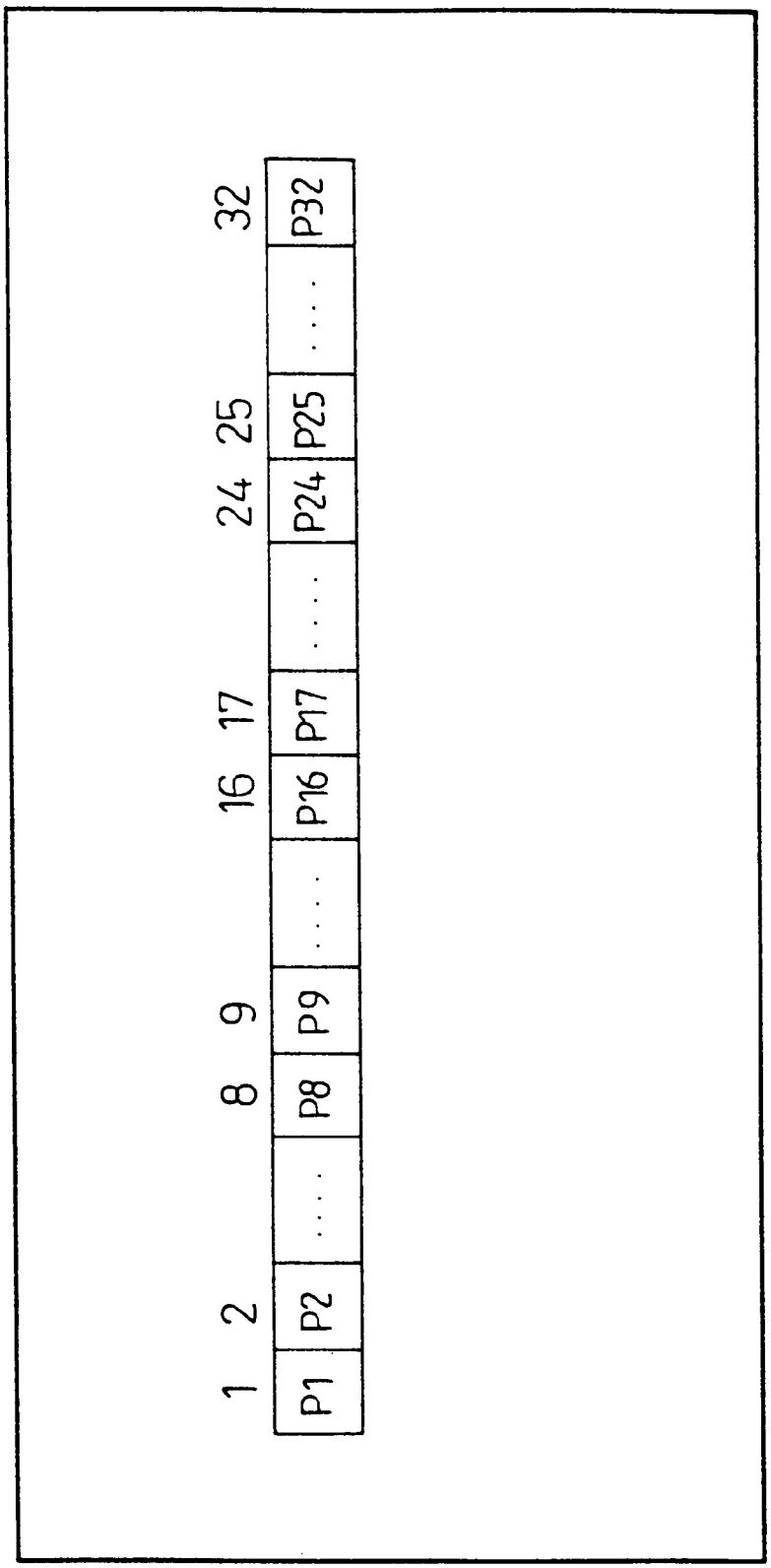
FIG. 3B illustrates how the photographed image data are retrieved in a line access mode.
Figure 4A:
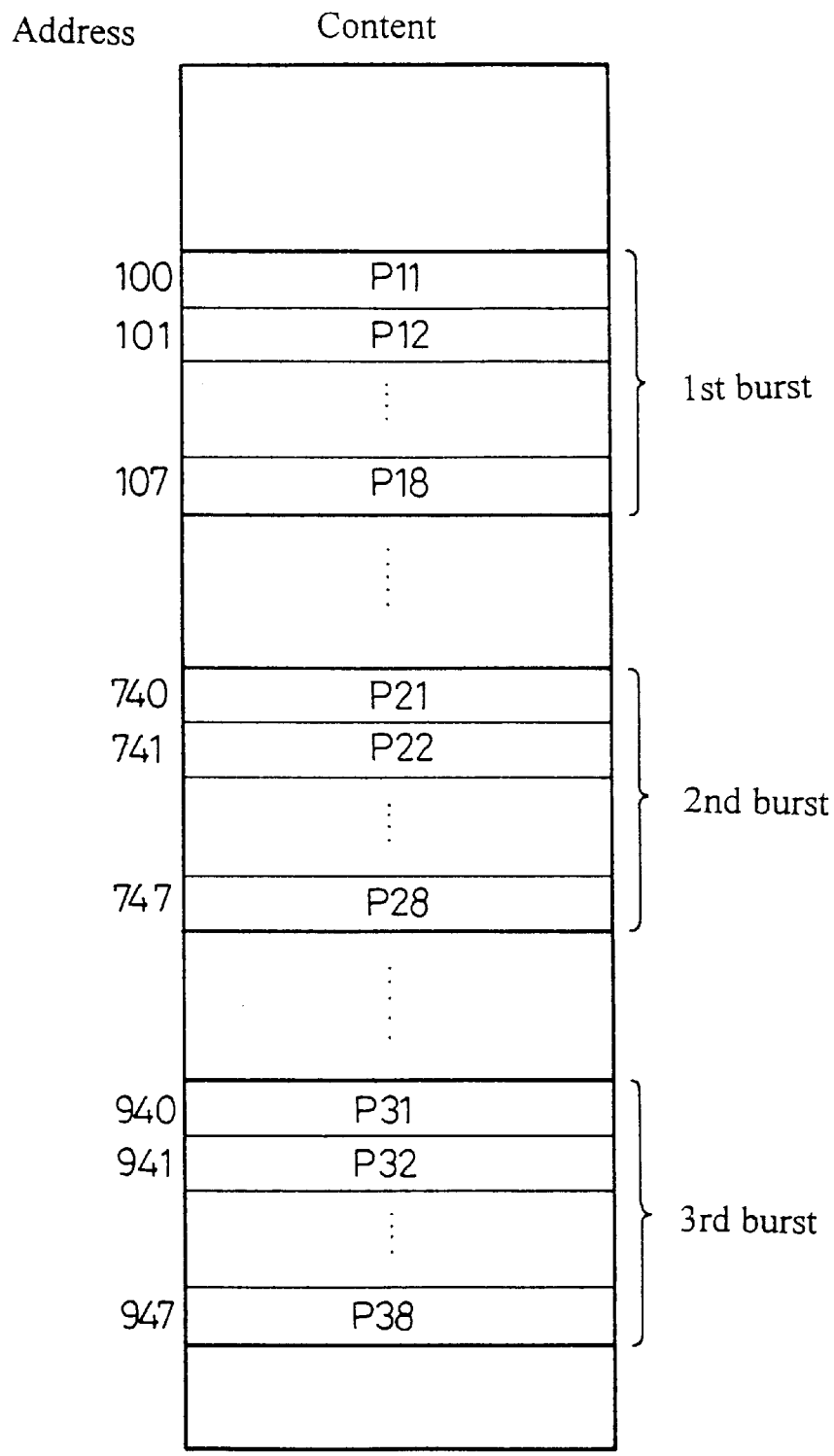
FIG. 4A illustrates how the image data retrieved in a block access mode are stored in a memory.

The address generator 91, configured to generate the starting address of each burst of image data located in different memory locations, comprises a starting address register 911 for storing the starting address of the first burst of the image data being retrieved by the digital signal processor 7, an offset register 912 programmed by the digital signal processor 7 for storing the jumping distance between two discontinuous bursts of image data, and an address refreshing register 913 for storing the starting address of the burst of image data being currently retrieved and corresponding to the burst number generated by the burst counter 901. After receiving the address information regarding the image data to be retrieved by the digital signal processor 7, the address generator 91 generates various addresses of memory locations of the image data to be retrieved within a picture frame of data. Alternatively, the address generator 91 and termination signal generator 90 can also be modified by utilizing a single register for storing both the burst number value stored in register 902 and the offset address value stored in register 912. A circuit for iteratively summing one variable value with one fixed value is suitable for replacing the address refreshing register 913 and the offset register 912. The access controller 82 is operated in a block access mode if the offset register 912 is set to have a value equal to a line width of a picture frame (e.g. 640×480 pixels) of data. As shown in FIG. 3A, given that the block size of image data to be processed by the digital signal processor 7 in this embodiment is 3×8 pixels and the burst of data that the SDRAM controller 5 can access from the SDRAM 6 per 8-clock cycle is 8 words (one word for one pixel), then this block of image data (P11 . . . P18, P21 . . . P28, and P31 . . . P38) can be located in three different memory locations ranging from addresses denoted 100 to 107, 740 to 747, and 940 to 947, for example (see FIG. 4A). The data my be accessed in three separate bursts of image data separated from one another as shown in FIG. 4A. In this case, the burst number register 902 and the starting address register 911 are programmed by the digital signal processor 7 to have values of 3 and 100, respectively, and the offset register 912 is programmed by the digital signal processor 7 to have a value equal to a line width of a picture frame, for example 640 pixels (which corresponds to 640 memory address differences if one pixel corresponds to one word).

Referring again to FIGS. 2A and 2B, after the termination signal generator 90 and the address generator 91 within the access controller 82 are programmed with the address information sent from the digital signal processor 7 via the buses 84 and 89, the switch 83 is then prompted by the access controller 82 to connect to SDRAM controller 5 through the bus 85. In the block access mode, the address refreshing register 913 first loads the starting address value (100) stored in the starting address register 911 to the SDRAM controller 5 for locating the first burst of image data via the switch 83 and the bus 85. At the same time, the burst counter 901 counts one. Next, the starting address value is fed via a feedback loop 914 to an adder 915 for addition with the offset value (640) from the offset register 912. The sum (740) of the starting address value and the offset value is sent to the address refreshing register 913 and then transferred to the SDRAM controller 5 for locating the second burst of image data via the switch 83 and the bus 85. At the same time, the burst counter 901 up-counts to two. In this way, the address value in the address refreshing register 913 is iteratively summed with the offset value in the offset register 912 until the burst counter 901 up-counts to the burst number (which is 3 in this case) stored in the burst number register 902.

After the SDRAM controller 5 loads these three bursts of image data into the block buffer 81 via the bus 85, the access controller 82 prompts the switch 83 to interconnect the block buffer 81 and the digital signal processor 7 through bus 89 and bus 86, thus allowing the block buffer 81 to act as an internal memory buffer of the digital signal processor 7. The access controller 82 then sends an interrupt via the line 87 to the digital signal processor 7 to interrupt the current processing of the digital signal processor 7 and inform the digital signal processor 7 to sequentially access the image data (P11 . . . P18, P21 . . . P28, and P31 . . . P38) within the block buffer 81.

In the case of retrieving a block of image data within a picture frame of data, unlike the conventional digital signal processing architecture that accesses the bursts of image data separately located in the SDRAM 6 for plural clock cycles including three clock cycles, for initialization for accessing each burst of data, the digital signal processor 7 only needs to set in the image buffer 8 the burst size and the starting address of the image data to be retrieved within a single clock cycle. The digital signal processor 7 then executes other processing routines, and finally receives the retrieved image data, thereby significantly reducing processing time of the digital signal processor 7 on retrieving a block of image data within a picture frame of data.

The digital signal processor 7 can therefore access the image data in a block access mode, which corresponds to several image blocks within a picture frame, whether the several blocks are adjacent to one another or not. These blocks of image data can be stored together in the block buffer 81 as long as the block buffer 81 is large enough, or can be stored sequentially in the block buffer 81 within several clock cycles. The image buffer 8 undertakes the time-consuming burden of accessing block(s) of image data, thus significantly reducing the read/write overhead of the digital signal processor 7 with increasing block size.

According to another embodiment of the present invention, the access controller 82 is operated in a line access mode when the offset register 912 is set to have the size of a burst which is the minimum unit of data that can be accessed from the SDRAM 6 at a time. As shown in FIG. 3B, in this embodiment, given that the line size of the image data to be processed by the digital signal processor 7 is 1×32 pixels and the burst of data that the SDRAM controller 5 can access from the SDRAM 6 per 8-clock cycle is 8 words (one word for one pixel), then this line of image data (P1, P2 . . . P8, P9 . . . P16, P17 . . . P24, and P25 . . . P32) is located in four adjacent memory locations ranging from addresses denoted 1000 to 1007, 1008 to 1015, 1016 to 1023, and 1024 to 1031 in FIG. 4B, thus forming four adjacent bursts of image data. In this case, the burst number register 902 and the starting address register 911 are programmed by the digital signal processor 7 through the bus 84 to have a value of 4 and 1000, respectively, and the offset register 912 is programmed by the digital signal processor 7 to have a value of the burst size of a picture frame (which is for example 8 memory locations in this case). After the termination signal generator 90 and the address generator 91 within the access controller 82 are programmed with the address information sent from the digital signal processor 7 via the buses 84 and 89, the switch 83 is then prompted by the access controller 82 to connect to SDRAM controller 5 through the bus 85. In the line access mode, referring to FIG. 2B, the address refreshing register 913 first loads via bus 85 the starting address value stored in the starting address register 911 to the SDRAM controller 5 for locating the first burst of image data. At the same time, the burst counter 901 counts one. Next, the starting address value (1000) is fed via a feedback loop 914 to an adder 915 for addition with the offset value (8) from the offset register 912. The sum (1008) of the starting address value and the offset value is sent to the address refreshing register 913 and then transferred via bus 85 to the SDRAM controller 5 for locating the second burst of image data. At the same time, the burst counter 901 up-counts to two. In this way, the address value in the address refreshing register 913 is iteratively summed with the offset value in the offset register 912 until the burst counter 901 up-counts to the burst number (which is 4 in this case) stored in the burst number register 902. After the SDRAM controller 5 loads these four bursts of image data into the block buffer 81 through bus 85 and bus 86, the access controller 82 prompts the switch 83 to interconnect the block buffer 81 and the digital signal processor 7 through bus 86 and bus 89, thus allowing the block buffer 81 to be used as an internal memory buffer of the digital signal processor 7. The access controller 82 then sends an interrupt via the line 87 to the digital signal processor 7 to interrupt the current processing of the digital signal processor 7 and prompt the digital signal processor 7 to access image data within the block buffer 81. In the case of retrieving a line of image data within a picture frame of data (in which the offset value is given as the burst size of data that can be accessed from the SDRAM per clock cycle), the digital signal processor 7 only has to set the burst number and the starting address of the image data to be retrieved. This significantly reduces processing time of the digital signal processor 7 upon retrieving a line of image data within a picture frame of data. The digital signal processor 7 can therefore access the image data in a line access mode, which can correspond to several image lines within a picture frame of data whether those several lines are adjacent to one another or not.

Figure 3C:
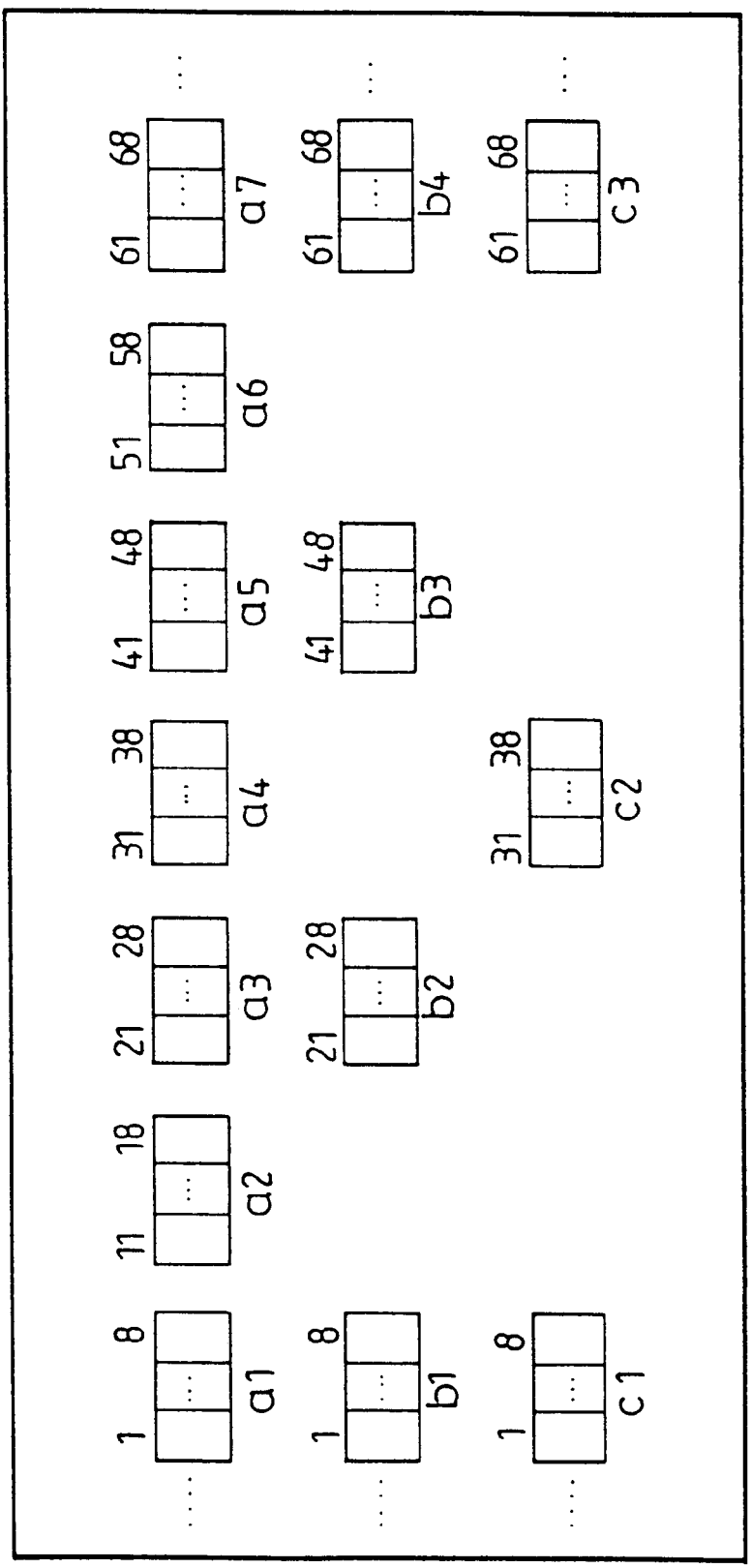
FIG. 3C illustrates how the photographed image data are retrieved in a sub-sampling mode.
Figure 4C:
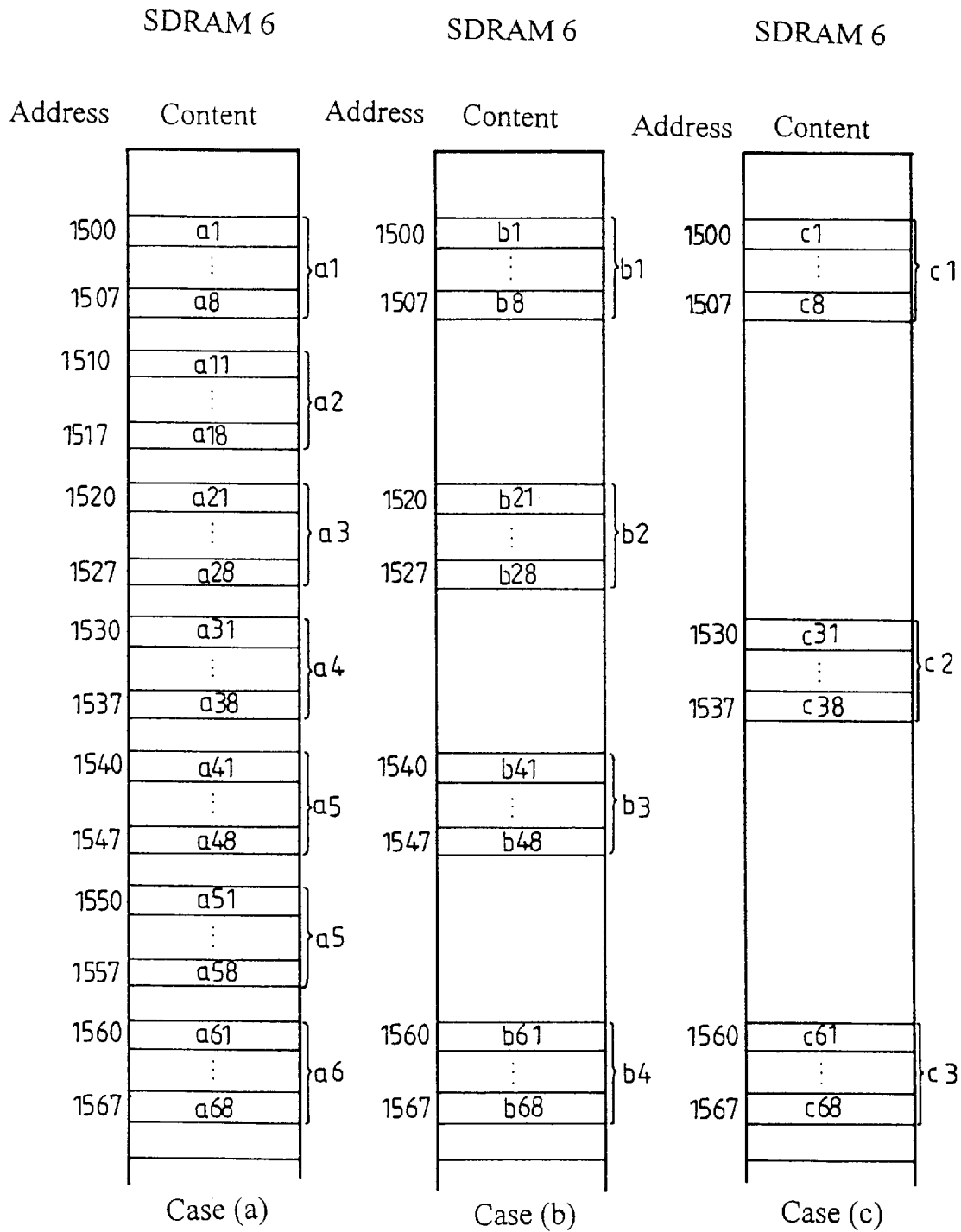
FIG. 4C illustrates how the image data retrieved in a sub-sampling mode are stored in memory.

According to still another embodiment of the invention, the aspects of the invention mentioned above can apply to the analysis of image parameters such as chroma, brightness, and so on. Namely, the access controller 82 can be operated in a sub-sampling mode to capture data from spatially diverse locations within a picture frame of data when the offset value stored in the offset register 912 is the sub-sampling distance between two adjacent sampled bursts. Referring to FIG. 3C, in this embodiment, given that the burst of data that the SDRAM controller 5 can access from the SDRAM 6 per clock cycle is 8 words (one word for one pixel) and the sub-sampling intervals are 10 pixels, 20 pixels, and 30 pixels for cases (a), (b) and (c), respectively, then this spatially diverse image data (a1, a2 . . . a7; b1, b2, b3; c1, c2) within a picture frame for cases (a)–(c) are located in several separate memory locations as shown in FIG. 4C. The sub-sampling rates for cases (a), (b), and (c) are 8/10 (=0.80), 8/20 (=0.40), and 8/30 (=0.27), respectively, and the rate can be adjusted to achieve the desired sampling effect from the picture frame of data.

In this embodiment, the burst number register 902 and the starting address register 911 are programmed by the digital signal processor 7 to have a value of 7 and 1500, respectively, and the offset register 912 is programmed by the digital signal processor 7 to have a value equal to the sub-sampling distance of a picture frame of data (for example, 10 pixels for case (a), 20 pixels for case (b), and 30 pixels for case (c)). Referring again to FIG. 2B, the address refreshing register 913 first loads the starting address value stored in the starting address register 911 to the SDRAM controller 5 for locating the first burst of image data. At the same time, the burst counter 901 counts one. Next, the starting address value (1500) is fed via the feedback loop 914 to the adder 915 for addition with the offset value (10 for case (a), 20 for case (b), and 30 for case (c) from the offset register 912). The sum (1510, 1520 or 1530) of the starting address value and the offset value is sent to the address refreshing register 913 and then transferred to the SDRAM controller 5 for locating the second burst of image data. At the same time, the burst counter 901 up-counts to two. In this way, the address value in the address refreshing register 913 is iteratively summed with the offset value in the offset register 912 until the burst counter 901 up-counts to the burst number (which is 7 in this case) stored in the burst number register 902. After the SDRAM controller 5 loads these seven bursts of image data into the block buffer 81, the access controller 82 prompts the switch 83 to interconnect the block buffer 81 and the digital signal processor 7, thus allowing the block buffer 81 to be used as an internal memory buffer of the digital signal processor 7. Access controller 82 then sends an interrupt to the digital signal processor 7 to interrupt the current processing of the digital signal processor 7 and prompts the digital signal processor 7 to access the sub-sampled image data within the block buffer 81. The digital signal processor 7 can process the sub-sampled image data to effectively obtain the color attributes of the picture frame such as chroma, brightness, and so on.

In the case of retrieving in a sub-sampled image data within a picture frame of data, the digital signal processor 7 only has to set the burst number, the sub-sampling rate and the starting address of the sub-sampled image data to be retrieved. The digital signal processor 7 can therefore access the image data in a sub-sampling mode, which corresponds to several image bursts within a picture frame of data whether these several bursts are adjacent to one another or not. This function can be used to provide sampled data for the calculation of parameters such as white balance, exposure (AE) and focus without the need for sensors dedicated to those purposes. The results of these calculations can then be used in the standard manner to adjust the image quality of the system.

According to the above principals, the digital signal processor 7 can also retrieve the image data from the SDRAM 6 in a sub-sampled, block access mode or a sub-sampled, line access mode by providing the sub-sampling rate, the block starting address, the offset of the image data to the access controller 82.

With the structure of the image buffer 8 interfaced between the digital signal processor 7 and the SDRAM 6, upon retrieving image data from the SDRAM 6 for processing, the digital signal processor 7 can process a flexible amount of the image data within a picture frame of data by merely setting the parameters regarding the processing mode and the locations of the image data in the image buffer 8, thus significantly reducing the read/write overhead and interrupt latency of the digital signal processor 7.

Although the invention has been disclosed in terms of preferred embodiment of a digital camera, the disclosure is not intended to so limit the invention. For example, the principals of the invention can apply to any digital signal processing system employing a digital signal processor in conjunction with a memory. One skilled in the art will appreciate that the information disclosed herein can be modified or varied without departing from the scope and spirit of the invention.

What is claimed is:

1. An image processing system, comprising:

a) a memory capable of storing a picture frame of image data and outputting said data in a format comprising one or more bursts of data sampled from spatially diverse locations within said picture frame of data;

b) a data processor capable of processing at a given time an amount of data less than said one or more bursts of data; and c) a data buffer coupled between said memory and said data processor, said data buffer having a size sufficient to store said one or more bursts of data and capable of outputting an amount of data within the processing capability of said data processor.

2. An image processing system, comprising:

a) a burst memory;

b) a data processor;

c) a data buffer coupled between said burst memory and said data processor, said data buffer comprising:

i) a block memory coupled to said burst memory and to said data processor; and ii) an access controller coupled to said block memory, to said data processor and to said burst memory, said access controller operable to transfer data from said burst memory to said block memory in a format specified to said access controller by said data processor, said access controller also operable to transfer said formatted data from said block memory to said data processor.

3. The image processing system of claim 2, wherein said format comprises a block of data within a picture frame of data.

4. The image processing system of claim 2, wherein said format comprises a line of data within a picture frame of data.

5. The image processing system of claim 2, wherein said format comprises data sampled from spatially diverse locations within a picture frame of data.

6. A method of processing image data in a camera, comprising the steps of:

a) storing said image data in a memory;

b) selecting a portion of said image data in a format determined by a data processor coupled to said memory, said data processor setting a burst length, burst number, and burst offset in a burst memory;

c) storing said formatted data in a second memory; and d) transferring said formatted data to said data processor.

7. A method of processing image data in a camera, comprising the steps of:

a) storing said image data in a memory;

b) selecting a portion of said image data in a format determined by a data processor coupled to said memory, said data processor selecting a spatially diverse sample of an image;

c) storing said formatted data in a second memory; and d) transferring said formatted data to said data processor.

8. The method of claim 7, further comprising the step of using said data processor to perform calculations using said spatially diverse sample to determine the quality of an image captured by said camera.

* * * * *